(12) United States Patent
Goodwin

(10) Patent No.: US 6,390,283 B1
(45) Date of Patent: May 21, 2002

(54) CAST AUGER GATING INTERFACE

(75) Inventor: Vernon Eugene Goodwin, Gays, IL (US)

(73) Assignee: Blaw-Knox Construction Equipment Corporation, Matoon, IL (US)

( * ) Notice: Subject to any disclaimer, the term of this patent is extended or adjusted under 35 U.S.C. 154(b) by 0 days.

(21) Appl. No.: 09/778,422

(22) Filed: Feb. 7, 2001

(51) Int. Cl.⁷ .............................................. B65G 33/30
(52) U.S. Cl. ...................................... 198/664; 198/676
(58) Field of Search ................................ 198/664, 676, 198/677

(56) References Cited

U.S. PATENT DOCUMENTS

| 525,194 A | | 8/1894 | Dyson et al. |
| 643,636 A | * | 2/1900 | Elmer ........................ 198/664 |
| 1,775,888 A | | 9/1930 | Christian |
| 2,492,915 A | | 12/1949 | Carlson |
| 3,485,116 A | | 12/1969 | Fender |
| 3,590,985 A | | 7/1971 | Hirsch |
| 5,279,501 A | * | 1/1994 | Shelley ........................ 198/664 |

* cited by examiner

Primary Examiner—Joseph E. Valenza
(74) Attorney, Agent, or Firm—Michael Best & Friedrich LLP

(57) ABSTRACT

The auger includes a first cast section and a second cast section. The first cast section includes a first flight having a gate projection that remains on the first flight after a gate which is used during casting the first cast section has been removed from the first cast section. The second cast section includes a second flight having a recess that receives the gate projection when the first flight is coupled to the second flight such that the gate projection does not need to be ground off in order to attach the first cast section to the second cast section. The first flight is attached with the second flight to create a substantially smooth and unbroken transition between the first flight and the second flight such that the auger efficiently transports paving material from the hopper of a road paving machine onto a prepared road bed.

27 Claims, 2 Drawing Sheets

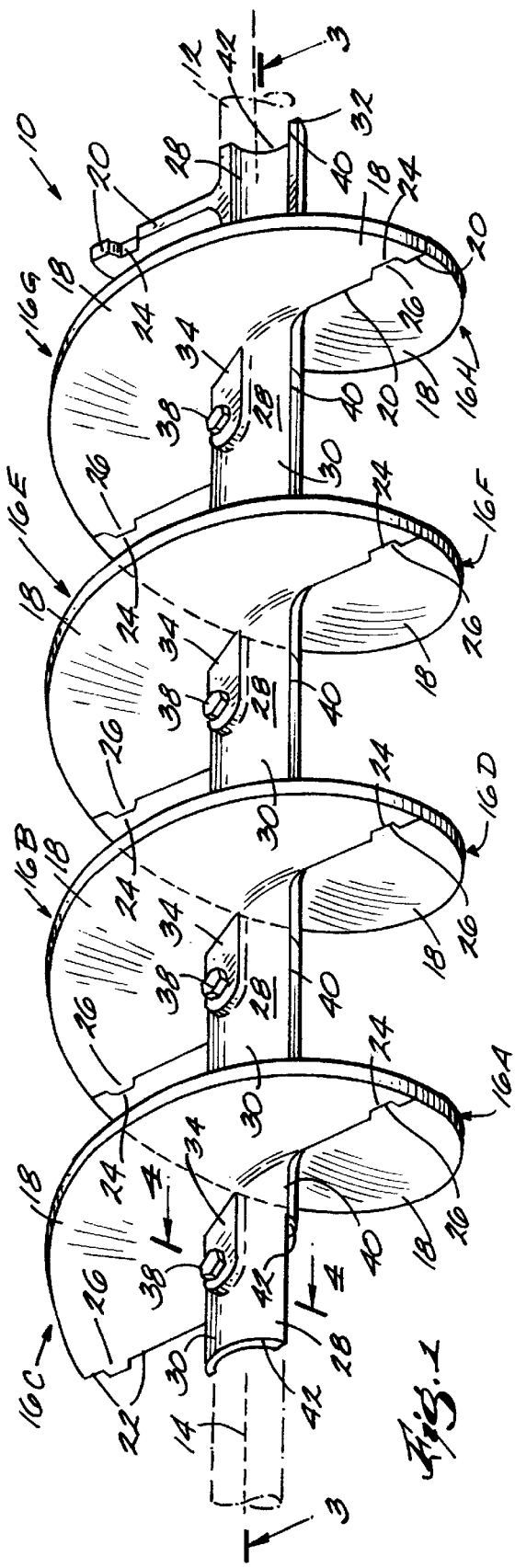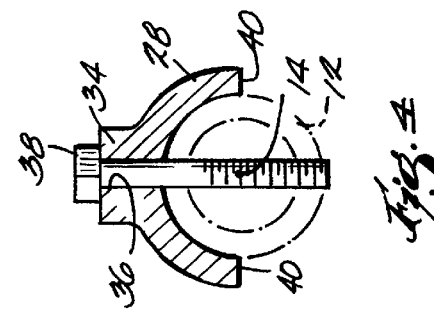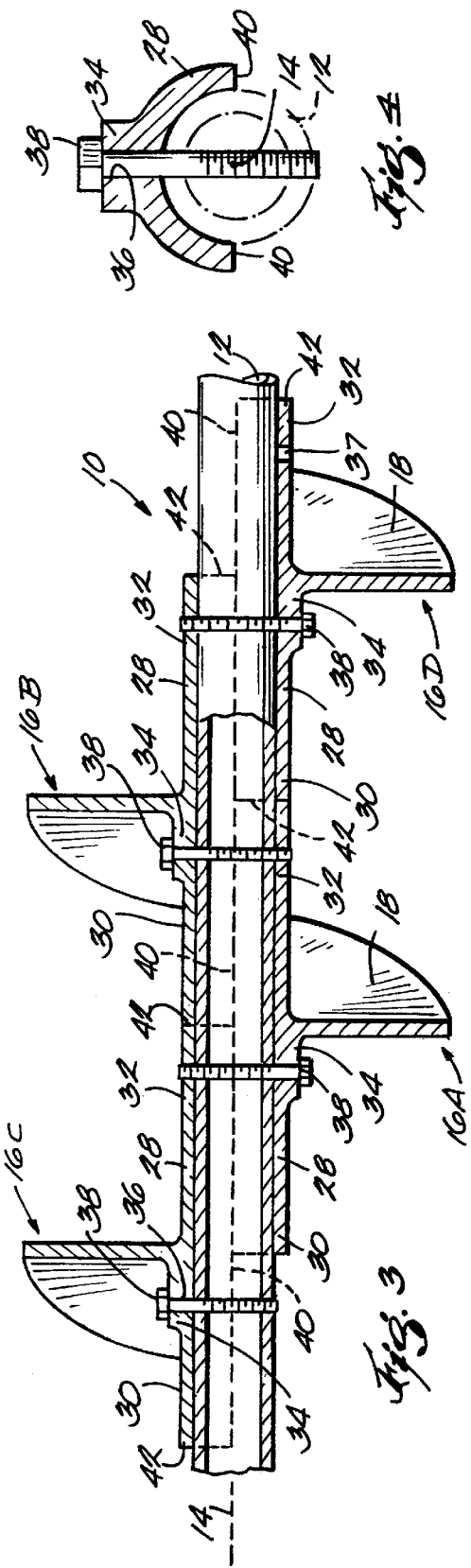

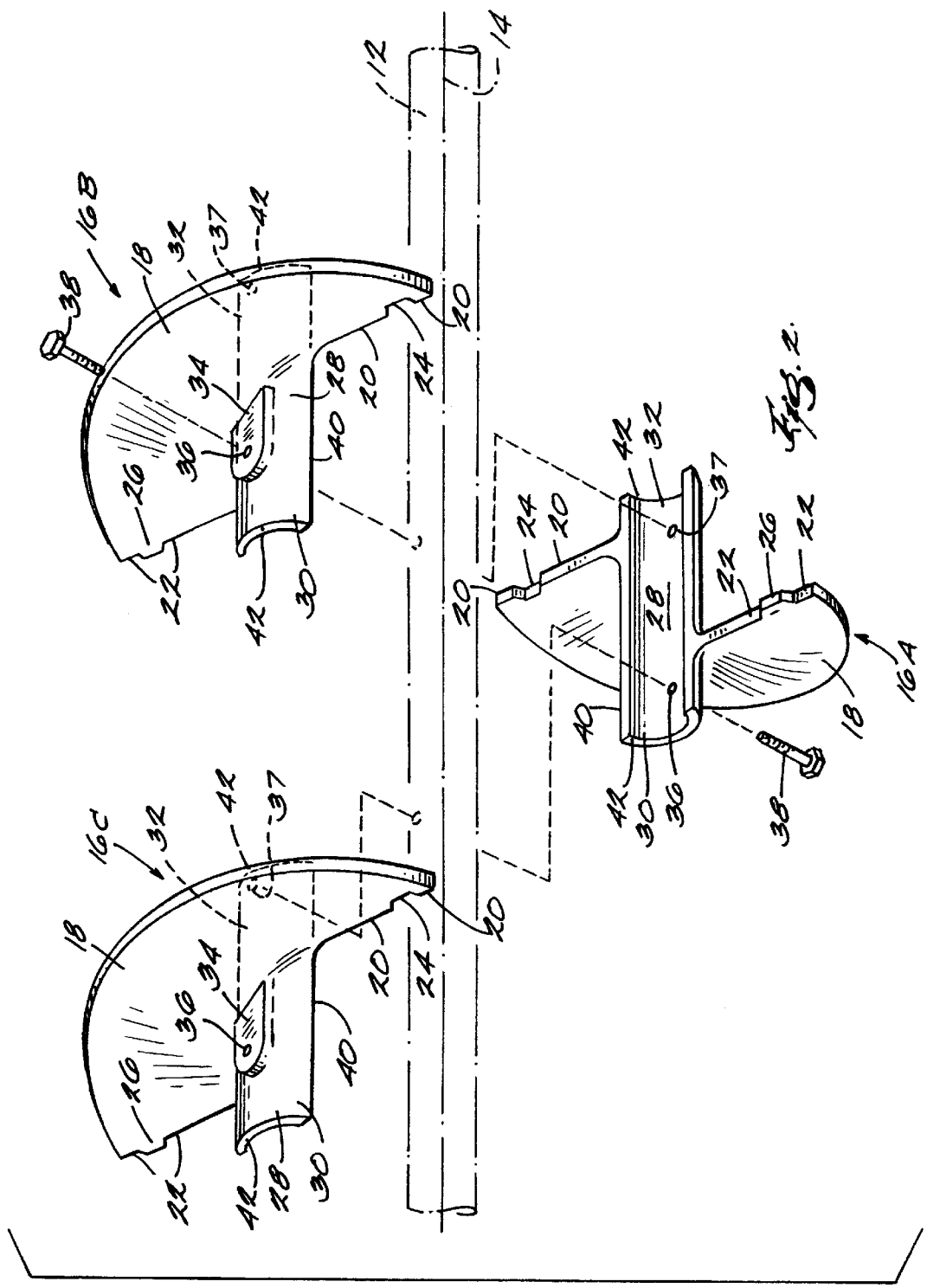

CAST AUGER GATING INTERFACE

FIELD OF THE INVENTION

The invention relates to road paving machines, and more particularly to a cast auger for transporting paving material from a road paving machine to a road bed.

BACKGROUND OF THE INVENTION

Road paving machines are used to deposit, spread, and compact an aggregate-filled tar-based paving material onto a prepared road bed to form a hard pavement surface. The consistency of the paving material makes it difficult to maneuver the paving material from the road paving machine onto the road bed.

A typical road paving machine includes a rotating auger that acts as a screw conveyor which mixes and transports the paving material from a storage hopper on the paving machine onto the road bed. The auger includes a plurality of flight sections that are usually individually cast and then assembled together by butt welds, rivets, keys, butt straps, lap joints, dovetails, or by other conventional means. One or more of the flight sections are usually fastened to one another or a rotatable drive shaft. In an alternative form, each flight section is independently mounted to the shaft to eliminate the need to mechanically fasten the intermediate flight sections together.

During the casting process molten metal is poured through a runner and a gate to feed a cavity within a tool. This cavity is generally the shape of the desired flight section. After the metal has cooled the runner and gate are removed from the flight by a cutoff operation that leaves a gate projection (or witness) attached to the flight section. It is necessary to remove the gate projection so that there is a smooth transition between adjacent flight sections. The gate projections are typically ground flush to the surface of the flight section by using an abrasive belt or some similar device. This grinding operation is generally time consuming, costly, and labor intensive.

The above described augers are generally effective for mixing and transporting paving material from a hopper to a road bed. Therefore, any improvement in the design or manufacture of such augers would be desirable.

SUMMARY OF THE INVENTION

The present invention is directed to a cast auger for a road paving machine. The auger is rotated within the paving machine in order to mix and transport paving material from a storage hopper on the road paving machine onto a road bed.

The auger of the present invention simplifies fabrication of the auger by eliminating costly grinding operations that are associated with casting the auger. The cast auger of the present invention is also readily adapted for use in existing road paving machines.

The auger includes a first cast section and a second cast section. The first cast section includes a first flight having a gate projection that remains on the first flight after a gate which is used during casting the first cast section has been removed from the first cast section. The second cast section includes a second flight having a recess that receives the gate projection when the first flight is coupled to the second flight such that the gate projection does not need to be ground off in order to attach the first cast section to the second cast section. The first flight is attached with the second flight to create a substantially smooth and unbroken transition between the first flight and the second flight such that the auger efficiently transports paving material from the hopper of a road paving machine onto a prepared road bed.

Other features and advantages of the invention will become apparent to those skilled in the art upon review of the following detailed description, claims, and drawings.

BRIEF DESCRIPTION OF THE DRAWINGS

FIG. 1 is a perspective view of a cast auger of the present invention.

FIG. 2 is an exploded perspective view of the auger illustrated in FIG. 1.

FIG. 3 is a section view taken along line 3—3 in FIG. 1.

FIG. 4 is a section view taken along line 4—4 in FIG. 1.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting" of and variations thereof herein is meant to encompass only the items listed thereafter. The use of letters to identify elements of a method or process is simply for identification and is not meant to indicate that the elements should be performed in a particular order.

DETAILED DESCRIPTION OF THE INVENTION

FIG. 1 illustrates a cast auger 10 according to the present invention. The cast auger is used in road paving machines. The cast auger 10 is coupled to a shaft 12 that is mounted for rotation about an axis 14 within the road paving machine. When the shaft 12 is rotated, the cast auger 10 conveys paving material from a hopper on the road paving machine onto a prepared road bed.

The cast auger 10 includes several cast sections 16A–16H that are coupled together to substantially cover the length of the shaft 12. The cast sections 16 preferably have the same shape for fabrication purposes, but the invention is not limited to similarly shaped cast sections 16. It should be noted that the eight cast sections 16A–16H are not required to practice the present invention because a cast auger 10 of the present invention may include two or more cast sections 16 without departing from the scope of the invention. Since the illustrated embodiment utilizes cast sections 16 that have the same shape, only the shape of one cast section 16 will be described in detail below.

Referring now also to FIG. 2, each cast section 16 includes a helically-shaped flight 18 that spirals around the axis of rotation 14. The flight 18 extends halfway around the axis of rotation 14 of the shaft 12. The flight 18 provides a driving structure on the cast auger 10 that is used to convey the paving material from the road paving machine. The flight 16 includes a first mating face 20 and a second mating face 22. The first mating face 20 is located on one end of the flight 18 while the second mating face 22 is located on an opposing end of the flight 18 such that the mating faces 20, 22 are approximately 180 degrees apart from each other. The mating faces 20, 22 provide a coupling surface between adjacent coupled cast sections 16 of the auger 10.

The first mating face 20 includes a recess 24 that extends into the flight 18 from the first mating surface 20. The recess 24 preferably becomes narrower as the recess 24 extends away from the first mating face 20.

The second mating face 22 includes a gate projection 26 that extends outward from the second mating face 22. The gate projection 26 of the second mating face 22 preferably becomes narrower as the gate projection 26 extends away from the second mating face 22.

During assembly of the cast auger 10, the gate projection 26 on the second mating face 22 fits within the recess 24 on the first mating face 20 of an adjacently coupled cast section 16. The recess 24 and the gate projection 26 are preferably located at intermediate positions on their respective mating faces 20, 22. The configuration of the gate projection 26 and the recess 24 on each cast section 16 allows a substantially smooth and unbroken transition between flights 18 of adjacent cast sections 16 such that the cast auger 10 can efficiently transport paving material from the hopper of a road paving machine onto a prepared road bed.

The cast sections 16 are fabricated by a typical casting process. Since the individual sections 16 of the auger 10 are manufactured by casting, it is practical to fabricate the cast sections 16 with the same shape so that only a single tool is necessary. During typical casting operations, molten metal is poured through a feeding system comprised of runners and a gate to feed a cavity within the tool that is the shape of the desired cast section 16. The gate and the runner system are removed by a rough cutoff operation after the metal has cooled. The cutoff operation typically leaves a gate projection 26 attached to the cast section 16.

Historically, the gate projection 26 has been ground flush with the mating face 22 of the flight 18 such that no interference existed between adjacent flight sections 16. The configuration of the gate projections 26 and the recesses 24 of the present invention eliminates the need for precision grinding because the mating faces 20, 22 of adjacent flights 18 can be attached to each other without interference from an unground gate projection 26. Eliminating the costly and time consuming grinding operation from the fabrication process results in substantial cost savings to auger manufacturers.

Each cast section 16 also preferably include a hub 28 that is located radially inward from the flight 18 such that the flight 18 divides the hub 28 into a first end 30 on one side of the flight 18 and a second end 32 on an opposing side of the flight 18. The hub 28 is preferably the shape of a half-cylinder such that when the hub 28 is coupled to the shaft 12 the hub 28 extends around only one half of the shaft 12.

Referring now also to FIGS. 3 and 4, the first end 30 of the hub 28 includes a mounting rib 34 that extends radially from the hub 28. The mounting rib 34 preferably includes a hole 36 such that a fastener 38 is inserted through the hole 36 and into the shaft 12 in order to couple the cast section 16 to the shaft 12. The fastener preferably extends entirely through the shaft 12 and through a second hole 37 located on a second end 32 of another hub 28. Although the illustrated embodiment is only shown with a single mounting rib 34 on the first end 30, a mounting rib 34 could be located on the second end 32 of the hub 28 instead. Alternatively, mounting ribs 34 could be located on both ends 30, 32 of the hub 28 in a number of different forms.

As best shown in FIG. 2, the hub 28 also includes a contact surface 40 having substantially planar edges that extend along the length of the half-cylindrically shaped hub 28. In addition, the first and second end 30, 32 of the hub 28 each include a semi-annular face 42.

Three of the adjacent cast sections 16A-16C will be particularly described with reference to FIGS. 1–3. A first cast section 16A is coupled to a second cast section 16B such that the gate projection 26 on the second cast section 16B is inserted into the recess 24 on the first cast section 16A. The first mating face 20 on the first cast section 16A preferably engages the entire substantially planar second mating face 22 of the second cast section 16B. The first and second cast sections 16A, 16B are preferably coupled to the shaft 12 by inserting a fastener 38 through the hole 36 on in the mounting rib 34 on the second cast section 16B through the shaft 12 and through the hole 37 of the first cast section 16A.

The third cast section 16C is coupled to the first cast section 16A and the second cast section 16B such that the gate projection 26 on the first cast section 16A is inserted into the recess 24 on the third cast section 16C. The first mating face 20 of the third cast section 16C preferably engages the entire substantially planar second mating face 22 of the first cast section 16A. The third cast section 16C is coupled to the shaft 12 by a fastener 38 that is inserted through the hole 36 in the mounting rib 34 on the first cast section 16A through the shaft 12 and through the hole 37 of the third cast section 16C.

As best shown in FIG. 1, the contact surfaces 40 of the second cast section 16B and the third cast section 16C engage with the entire contact surface 40 of the first cast section 16A. In addition, the semi-annular face 42 on the second end 32 of the hub 28 on the third cast section 16C engages with the semi-annular face 42 on the first end 30 of the hub 28 of the second cast section 16B (see FIG. 3). Additional cast sections 16 can be added on alternating sides of the shaft 12 in a similar manner as described above and shown in FIG. 1 until the desired length of the cast auger 10 is obtained.

We claim:

1. An auger for conveying paving material in a road paving machine, the auger comprising:
   a first cast section including a first flight having a recess; and
   a second cast section coupled to the first cast section, the second cast section including a second flight having a gate projection that fits within the recess when the first flight is coupled to the second flight.

2. The auger of claim 1, wherein the first flight includes a first mating face such that the recess extends into the first flight from the first mating face, and the second flight includes a second mating face such that the gate projection extends outward from the second mating face.

3. The auger of claim 2, wherein the recess is located at an intermediate position along the first mating face.

4. The auger of claim 3, wherein the gate projection is located at an intermediate position along the second mating face.

5. The auger of claim 2, wherein the first mating face and the second mating face are substantially planar.

6. The auger of claim 2, wherein the gate projection becomes narrower as the gate projection extends away from the second mating face and the recess becomes narrower as the recess extends away from the first mating face.

7. The auger of claim 2, wherein the first flight further includes a gate projection and the second flight further includes a recess.

8. The auger of claim 7, wherein the gate projection on the first flight fits within a recess on a third flight, and the recess on the second flight is configured to receive a gate projection on a fourth flight.

9. The auger of claim 1, wherein first and second flights have the same shape.

10. The auger of claim 1, wherein the first cast section further includes a first hub located radially inward from the first flight such that the first flight divides the first hub into a first end on one side of the first flight and a second end on an opposing side of the first flight, and the second cast section further includes a second hub located radially inward from the second flight such that the second flight divides the second hub into a first end on one side of the second flight and a second end on an opposing side of the second flight.

11. The auger of claim 10, wherein the first hub includes a first mounting rib extending from the first hub such that a fastener can extend through the first mounting rib for mounting the first cast section to a shaft.

12. The auger of claim 11, wherein the second hub includes a second mounting rib extending from the second hub such that a fastener can extend through the second mounting rib for mounting the second cast section to the shaft.

13. The auger of claim 10, wherein the first hub includes a first contact surface and the second hub includes a second contact surface such that the first contact surface engages with the second contact surface when the first flight is attached to the second flight.

14. The auger of claim 10, further comprising a third cast section including a third flight having a recess, wherein the first flight further includes a gate projection that fits within the recess of the third flight when the first flight is coupled to the third flight.

15. The auger of claim 14, wherein the third cast section further includes a third hub located radially inward from the third flight such that the third flight divides the third hub into a first end on one side of the third flight and a second end on an opposing side of the third flight, the first end of the second hub including a first semi-annular face that engages a second semi-annular face on the second end of the third hub when the first flight is attached to the second and third flights.

16. The auger of claim 15, wherein the third hub includes a third contact surface such that the entire first contact surface on the first hub engages a portion of the second and third contact surfaces on the respective second and third hubs when the first flight is attached to the second and third flights.

17. An auger for conveying paving material in a road paving machine, the auger comprising:
a first cast section including a first flight having a recess and a first mating face such that the recess extends into the first flight from the first mating face, and a first hub located radially inward from the first flight such that the first flight divides the first hub into a first end on one side of the first flight and a second end on an opposing side of the first flight; and
a second cast section coupled to the first cast section, the second cast section including a second flight having a second mating face and gate projection extending outward from the second mating face such that the gate projection fits within the recess and the first surface engages the second surface, and a second hub located radially inward from the second flight such that the second flight divides the second hub into a first end on one side of the second flight and a second end on an opposing side of the second flight.

18. An auger for conveying paving material in a road paving machine, the auger comprising:
a first cast section including a first flight having a gate projection that remains on the first flight after a gate which is used during casting the first cast section has been removed from the first cast section; and
a second cast section coupled to the first cast section, the second cast section including a second flight having a recess that receives the gate projection when the first flight is coupled to the second flight such that the gate projection does not need to be ground off in order to attach the first cast section to the second cast section.

19. The auger of claim 18, wherein attaching the first flight with the second flight creates a substantially smooth and unbroken transition between the first flight and the second flight such that the auger efficiently transports paving material from the hopper of a road paving machine onto a prepared road bed.

20. A method of manufacturing an auger for conveying paving material in a road paving machine, the auger comprising:
casting a first section including a first flight having a recess;
casting a second section including a second flight having a gate projection;
coupling the first section to the second section such that the gate projection on the second section is inserted into the recess on the first section.

21. The method of claim 20, further comprising coupling the first section to a shaft.

22. The method of claim 20, wherein coupling the first section to the shaft includes inserting a fastener through a mounting rib located on a first hub on the first section.

23. The method of claim 20, wherein coupling the first section to the second section includes engaging a portion of a first contact surface on a first hub of the first section with a portion of a second contact surface on a second hub of the second section.

24. The method of claim 20, wherein coupling the first section to the second section includes engaging a first mating face on the first flight of the first section with a second mating face on the second flight of the second section when the gate projection is inserted into the recess.

25. The method of claim 23, further comprising:
casting a third section including a third flight having a recess;
coupling the first section to the third section such that a gate projection on the first section is inserted into the recess on the third flight.

26. The method of claim 25, wherein coupling the first section to the third section includes engaging a semi-annular face on a third hub of the third section with a semi-annular face on the second hub of the second section.

27. The method of claim 26, wherein coupling the first section to the second section and coupling the first section to the third section includes engaging the entire first contact surface on the first hub of the first section with a portion of the second contact surface on the second hub of the second section and a portion of a third contact surface on the third hub of the third section.

* * * * *